United States Patent [19]
Smith

[11] Patent Number: 6,142,498
[45] Date of Patent: Nov. 7, 2000

[54] MOTORCYCLE FRAME

[75] Inventor: Donald Jerry Smith, Brooklyn Park, Minn.

[73] Assignee: Chrome Specialties, Inc., Fort Worth, Tex.

[21] Appl. No.: 09/210,156

[22] Filed: Dec. 11, 1998

[51] Int. Cl.[7] .................................................. B62D 61/02
[52] U.S. Cl. ........................ 280/281.1; 280/284; 180/227
[58] Field of Search ................. 280/281.1, 283, 280/284, 288; 180/218, 219, 228, 221, 227

[56] References Cited

U.S. PATENT DOCUMENTS

| | | | |
|---|---|---|---|
| 4,022,484 | 5/1977 | Davis | 280/284 |
| 4,744,579 | 5/1988 | Roatta | 280/275 |
| 5,377,776 | 1/1995 | Saiki | 180/219 |
| 5,857,538 | 1/1999 | Chambers | 180/219 |
| 5,921,339 | 7/1999 | Matsuura | 180/219 |

*Primary Examiner*—Paul N. Dickson
*Assistant Examiner*—Avraham H. Lerner
*Attorney, Agent, or Firm*—Thompson & Knight L.L.P.; Max Ciccarelli

[57] ABSTRACT

A motorcycle frame of the Softail® type having a main frame and a rear frame pivotally coupled to each other. The frame has inwardly displaced contoured members extending between the lower and upper longitudinal members to allow the drive member to be carried outside the contoured members. The frame also has a truss assembly extending between the lower longitudinal members which results in an improved load path from the transmission plate to the contoured members.

3 Claims, 3 Drawing Sheets

MOTORCYCLE FRAME

BACKGROUND OF THE INVENTION

1. Field of the Invention

This invention relates in general to motorcycle frames, and in particular to motorcycle frames of the type comprising a main frame with a pivotally mounted, dampened rear frame section.

2. Description of the Prior Art

In the 1970's Harley-Davidson developed the frame for its Softail® motorcycles. The typical frame for Harley-Davidson Softail® motorcycles is shown in U.S. Pat. No. 4,022,484. As shown in FIGS. 1–3 of U.S. Pat. No. 4,022,484, it is characterized by a main frame (2) and a rear frame (3) (often referred to as a swingarm) which is pivotally attached to the main frame. A damping means also couples the main and rear frames.

The frame shown in FIGS. 1–3 of U.S. Pat. No. 4,022,484 is generally representative of prior art frames for Softail® motorcycles. Namely, the main contoured members (13) connect the secondary longitudinal members (12) to the lower longitudinal members (7). The swingarm (3) has rear contoured members (14) such that when the swingarm (3) is mounted to the main frame (2), the rear contoured members (14) are located inward of the main contoured members (13).

Prior art Softail® motorcycle frames (such as that shown in FIGS. 1–3 of U.S. Pat. No. 4,022,484), were designed such that the drive belt, chain, or other drive member (not shown in U.S. Pat. No. 4,022,484) is located interiorly of both the main contoured member (13) and the rear contoured member (14). When the drive belt on motorcycles using this type of frame needs to be replaced, the swingarm (3) must be removed, requiring considerable labor.

Also, if prior art Softail®-type frames are adapted to accommodate large rear tires, the resulting width of the tire, the drive belt, and the main and rear contoured members results in the distance between the secondary longitudinal members (see FIGS. 1–3 of U.S. Pat. No. 4,022,484) being rather large. This can be uncomfortable for the rider.

Also, the load path between the transmission plate and the main contoured members in prior art Softail®-type motorcycle frames is rather long. The load is transferred from the transmission plate to the lower longitudinal members, and then from the lower longitudinal members to the main contoured members.

Finally, the prior art Softail®-type motorcycle frames are clearly identifiable as such because of the visibility of the main contoured members.

SUMMARY OF THE INVENTION

It is the general objective of the invention to provide an improved Softail®-type motorcycle frame.

It is another objective of the invention to provide an improved Softail®-type motorcycle frame on which the drive belt can be replaced without removing the swingarm.

It is another objective of the invention to provide an improved Softail®-type motorcycle frame with improved load paths between the transmission plate and the rear contoured members.

It is another objective of the invention to provide an improved Softail®-type motorcycle frame which can be adapted to accommodate wider tires without unduly increasing the distance between the secondary longitudinal members.

It is another objective of the invention to provide an improved Softail®-type motorcycle frame which more closely resembles the rigid-type motorcycle frames so common in years past.

The above as well as additional objectives are achieved as is now described. The improved Softail®-type motorcycle frame has main contoured members that are located inwardly of the secondary longitudinal members. The contoured members of the swingarm are such that when the swingarm is mounted to the main frame, the swingarm contoured members are located inwardly of the main contoured members. The belt drive is located outwardly of the swingarm contoured member and outwardly of the main contoured member. The main contoured members are connected at their lower end to the transmission plate so that the primary load path from the transmission plate to the main contour members does not pass through the lower longitudinal members.

The above as well as additional objectives, features, and advantages will become apparent in the following description.

DETAILED DESCRIPTION OF THE PREFERRED EMBODIMENT

Figure 1:
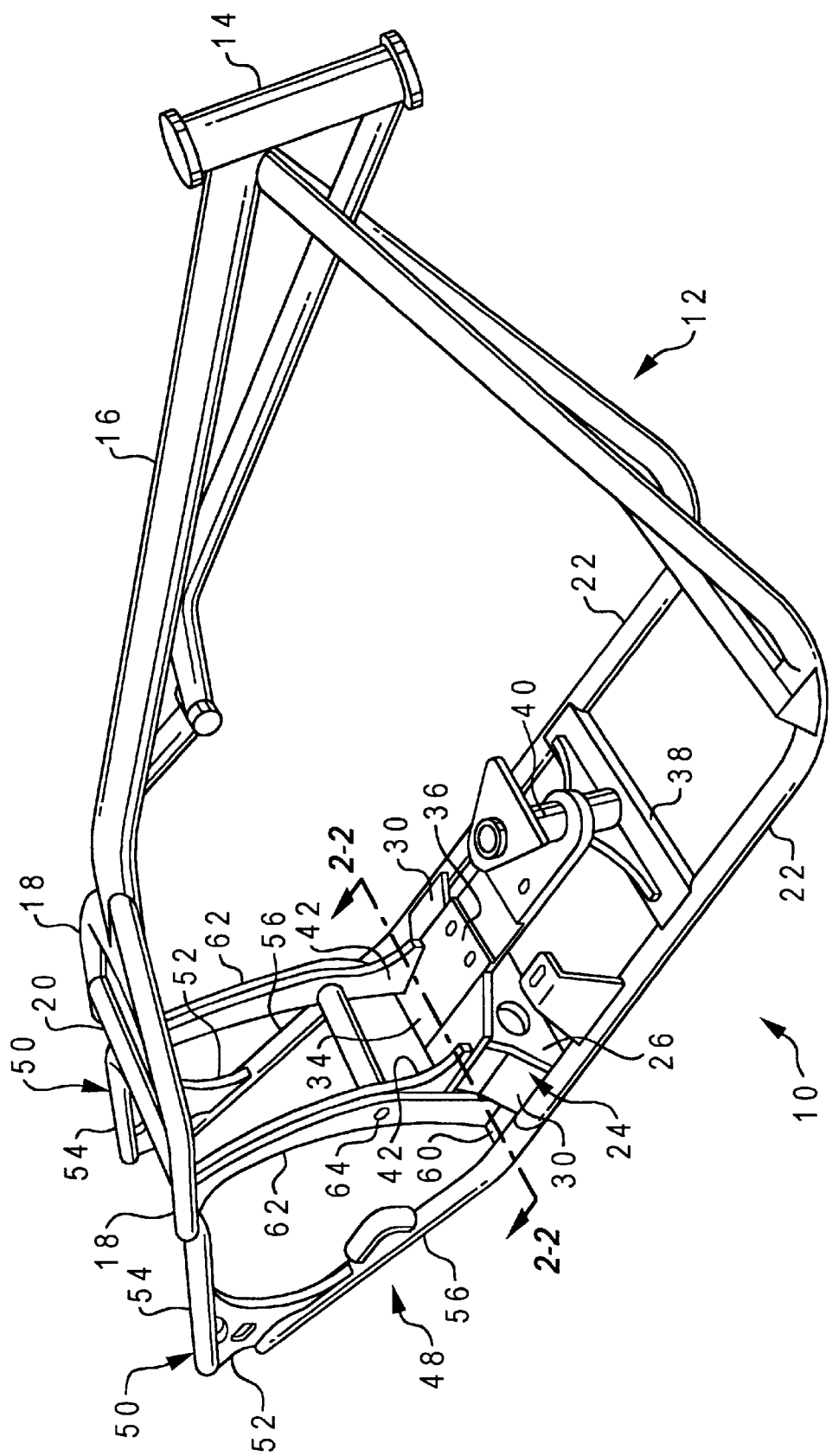
FIG. 1 is a perspective view of the improved motorcycle frame of the present invention.
Figure 2:
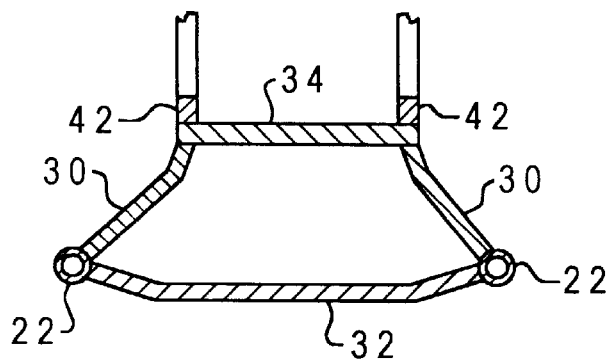
FIG. 2 is a cross sectional view of the improved motorcycle frame of the present invention, taken along line 2—2 of FIG. 1.
Figure 3:
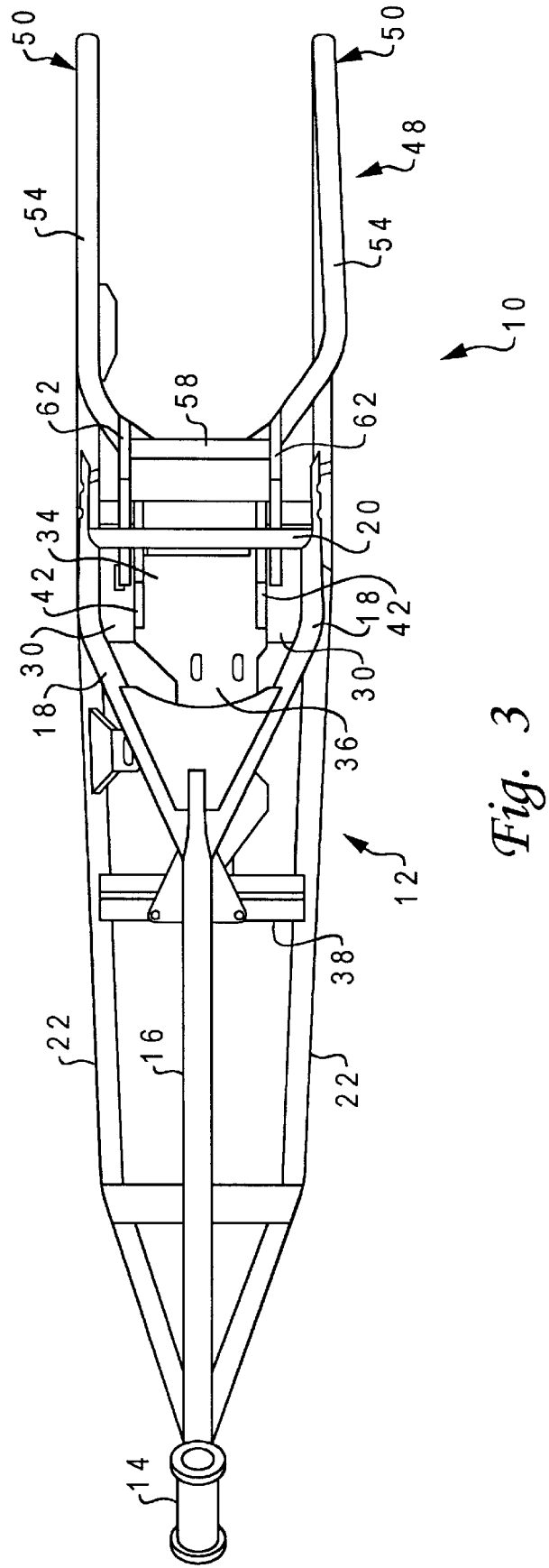
FIG. 3 is a top view of the improved motorcycle frame of FIG. 1.

FIGS. 1–3 depict the improved motorcycle frame 10 of the present invention. The main upper longitudinal member 16 extends rearward from the vertical steering assembly member 14. The rear end portion of the main upper longitudinal member 16 is connected to the secondary upper longitudinal members 18. An upper frame cross member 20 extends between the two secondary upper longitudinal members 18. Lower longitudinal members 22 extend rearward from the front of the frame.

A truss assembly 24 (or first lower frame cross member 24) connects the rear end portions of the lower longitudinal members to each other. Truss assembly 24 comprises front truss wall 26, side truss walls 30, bottom truss wall 32, and upper truss wall 34. Side truss walls 30 are angled inward and upward, resulting in upper truss wall 34 being narrower than bottom truss wall 32 and narrower than the distance between lower longitudinal members 22. Upper truss wall 34 extends forward to form the transmission mounting plate 36.

Figure 4:
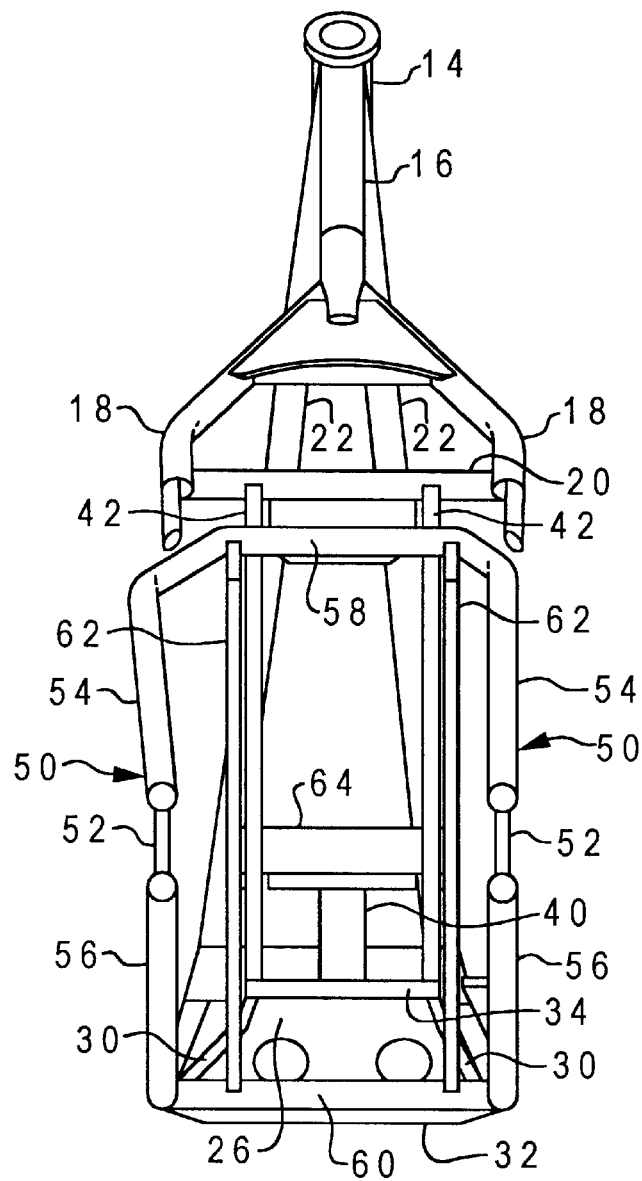
FIG. 4 is a rear view of the improved motorcycle frame of FIG. 1.

Extending from the upper truss wall 34 to the secondary upper longitudinal members 18, and at a position inward of lower longitudinal members 22 and secondary upper longitudinal members 18, are main contoured members 42. FIGS. 3 and 4 show particularly well how the main contoured members 42 are mounted inward of lower longitudinal members 22 and secondary upper longitudinal members 18. Connecting the main contoured members 42 directly to the upper truss wall 34 (which is essentially part of transmission mounting plate 36) provides a primary load path directly from the transmission mounting plate 36 to the main contoured member 42. This avoids some of the load from going though the frame.

Referring again to FIGS. 1–4, a second lower frame cross member 38 connects the lower longitudinal members to each other at a point forward of truss assembly 24. A vertical engine mounting member 40 protrudes upwardly from the second lower frame cross member 38. Vertical engine mounting member 40 protrudes only partially towards the main upper longitudinal member 16 and the secondary upper longitudinal members 18, thus leaving a substantially open engine and transmission compartment. Transmission mounting plate 36 connects vertical engine mounting member 40 to truss assembly 24, creating a very rigid transmission and engine mounting structures.

Referring still to FIGS. 1–4, the swing arm 48 (or rear frame 48) of the present invention is depicted. Left and right V-shaped members 50 comprise rear axle attachment lugs 52, swing arm lower side members 56, and swing arm upper side members 54. Rear axle attachment lugs 52 allow for attachment of swing arm 48 to the rear axle (not shown) along the rear axle axis. Upper and lower swing arm cross members 58, 60 connect the left and right V-shaped members 50 to each other.

Swing arm contoured members 62 (or side plates 62) are connected between the upper and lower swing arm cross members 58, 60. Swing arm contoured members 62 are located inward of V-shaped members 50 but outward of main contoured members 42. Swing arm frame attachment pivot 64 pivotally connects swing arm 48 to main frame 10.

Swing arm contoured members 62 and main contoured members 42 are connected so that when swing arm 48 is pivotally connected to main frame 12 the left swing arm contoured member 62 is adjacent the left main contoured member 42 and the right swing arm contoured member 62 is adjacent the right main contoured member 42. Also, the swing arm contoured members 62 and the main contoured members 42 are connected so that the drive belt, chain, or other drive member (not shown) travels outward of swing arm contoured members 62 and the main contoured members 42. This allows the drive belt to be replaced without having to remove swing arm 48.

Within limits, regardless of the tire width, the swing arm 48 can be made wider without changing the position or spacing of the main contoured members 42, the swing arm contoured members 62, and the secondary upper longitudinal members 18. This allows the driver's seat area to remain of a reasonable width, and hence comfortable, even with a very wide tire on the rear of the motorcycle.

Finally, because the main contoured members 42 and the swing arm contoured members 62 are located inward from the lower longitudinal members 22 and the secondary upper longitudinal members 18, when the various components of the motorcycle are assembled onto frame 10, the contoured members are substantially obscured from view, thus giving the motorcycle the appearance of having a rigid frame, but with all the benefits of a dampened ride.

While the invention has been particularly shown and described with reference to a preferred embodiment, it will be understood by those skilled in the art that various changes in form and detail may be made therein without departing from the spirit and scope of the invention.

What is claimed is:

1. A motorcycle frame comprising:
    a main frame having a front end and a rear end, the main frame comprising a steering assembly member located at the front end of the main frame, a plurality of lower longitudinal members connected to and extending rearward from said steering assembly member and terminating at the rear end of the main frame, a plurality of upper longitudinal members connected to the steering assembly member and disposed generally above the lower longitudinal members, an upper frame cross member located at the rear end of the main frame and extending between the plurality of upper longitudinal members, a first lower frame cross member located at the rear end of the main frame and extending between the plurality of lower longitudinal members;
    main contoured members located at the rear end of the main frame and extending between the upper frame cross member and the lower frame cross member, the main contoured members being located inward of the upper longitudinal members and the lower longitudinal members;
    a rear frame, comprising a plurality of longitudinal members coupled at one end thereof, and a plurality of rear contoured members disposed between, and inward of, said longitudinal members, said rear frame being pivotally mounted to said main frame; and
    wherein the motorcycle frame is adapted to carry the drive member outward of said main and rear contoured members.

2. The motorcycle frame according to claim 1 further comprising an engine mounting member which extends only partially toward a main upper longitudinal member.

3. The motorcycle frame according to claim 1 further comprising a second lower frame cross member extending between the plurality of lower longitudinal members, an engine mounting member which extends only partially toward a main upper longitudinal member, and a transmission mounting plate extending from the first lower frame cross member to the engine mounting member.

* * * * *